United States Patent
Sweeting

(10) Patent No.: US 10,005,159 B2
(45) Date of Patent: Jun. 26, 2018

(54) METHOD OF REMOVING WELD FLASH

(71) Applicant: ROLLS-ROYCE PLC, London (GB)

(72) Inventor: Paul Philip Sweeting, Nottingham (GB)

(73) Assignee: ROLLS-ROYCE plc, London (GB)

( * ) Notice: Subject to any disclaimer, the term of this patent is extended or adjusted under 35 U.S.C. 154(b) by 337 days.

(21) Appl. No.: 14/803,700

(22) Filed: Jul. 20, 2015

(65) Prior Publication Data

US 2016/0045988 A1 Feb. 18, 2016

(30) Foreign Application Priority Data

Aug. 15, 2014 (GB) .................................... 1414522.1

(51) Int. Cl.
| | |
|---|---|
| *B23K 37/08* | (2006.01) |
| *B23D 19/02* | (2006.01) |
| *B25J 11/00* | (2006.01) |
| *B23P 15/00* | (2006.01) |
| *F01D 5/34* | (2006.01) |
| *B23K 20/26* | (2006.01) |

(Continued)

(52) U.S. Cl.
CPC .............. *B23K 37/08* (2013.01); *B23D 19/02* (2013.01); *B23K 20/1205* (2013.01); *B23K 20/129* (2013.01); *B23K 20/26* (2013.01); *B23P 15/006* (2013.01); *B25J 11/006* (2013.01); *F01D 5/3061* (2013.01); *F01D 5/34* (2013.01); *B23K 2201/001* (2013.01)

(58) Field of Classification Search
CPC . B23P 15/006; B23K 37/08; B23K 2201/001; B25J 11/006; B29C 37/02; B29C 49/72; B23D 19/02; B23D 19/08
USPC ............... 29/889.2, 889.21, 889.23; 228/125
See application file for complete search history.

(56) References Cited

U.S. PATENT DOCUMENTS

| | | | | | |
|---|---|---|---|---|---|
| 2,873,227 | A | * | 2/1959 | Olson ..................... | B29C 51/14 156/196 |
| 3,171,317 | A | * | 3/1965 | Clarke .................... | B29C 37/02 83/496 |

(Continued)

FOREIGN PATENT DOCUMENTS

| | | | | | |
|---|---|---|---|---|---|
| CS | 617190 | * | 6/1992 | ............. | A43D 87/00 |
| FR | 969519 | * | 12/1950 | ............. | B23D 19/02 |

(Continued)

OTHER PUBLICATIONS

Nov. 26, 2014 Search Report issued in Application No. GB1414522.1.

*Primary Examiner* — Ninh H Nguyen
*Assistant Examiner* — Topaz L Elliott
(74) *Attorney, Agent, or Firm* — Oliff PLC

(57) ABSTRACT

Method of trimming weld flash from a weld joint formed between a first component and a second component. The method provides a rotary shear tool having a rotary blade and a second blade. The second blade may be a fixed blade. The method further includes shearing the weld flash from the weld joint by passing the weld flash between the rotary blade and second blade of the rotary shear tool. Also provides a rotary shear tool for trimming weld flash from a weld joint formed between a first component and a second component. The rotary shear tool includes: a rotary blade; a second blade; and a mounting portion for mounting the rotary shear tool on a robotic arm.

8 Claims, 2 Drawing Sheets

(51) Int. Cl.
  *B23K 20/12*    (2006.01)
  *F01D 5/30*     (2006.01)
  *B23K 101/00*   (2006.01)

(56) References Cited

U.S. PATENT DOCUMENTS

| | | | | |
|---|---|---|---|---|
| 3,364,710 | A * | 1/1968 | Rouyer | B21D 19/00 |
| | | | | 30/265 |
| 7,370,787 | B2 * | 5/2008 | Bacon | B21K 1/36 |
| | | | | 228/112.1 |
| 9,045,987 | B2 * | 6/2015 | Levine | F01D 5/187 |
| 2002/0127108 | A1 | 9/2002 | Crall et al. | |
| 2007/0234564 | A1 * | 10/2007 | Shafir | B23Q 15/02 |
| | | | | 29/889.7 |
| 2010/0332016 | A1 * | 12/2010 | Abrams | B25J 9/1684 |
| | | | | 700/160 |
| 2013/0336767 | A1 * | 12/2013 | Levine | F01D 5/187 |
| | | | | 415/115 |

FOREIGN PATENT DOCUMENTS

| | | | |
|---|---|---|---|
| GB | 129109 | A | 7/1919 |
| GB | 195460 | A | 4/1923 |
| SU | 897416 | A1 | 1/1982 |

\* cited by examiner

METHOD OF REMOVING WELD FLASH

FIELD OF THE INVENTION

The present invention relates to a method of removing weld flash from a weld joint e.g. a weld joint formed using linear flash welding. In particular, the present invention relates to a method of removing weld flash from a weld joint between an aerofoil blade and an annular support forming a blisk for use in a gas turbine engine.

BACKGROUND OF THE INVENTION

Bladed discs (or blisks) such as those used in the fan and compressor sections of a gas turbine engine are typically manufactured by joining the blades to the rotor disc using linear friction welding. In this process, one of the blade or rotor disc is oscillated laterally whilst being forced against the other. This generates heat through friction which results in the joining of the two parts along a weld joint.

A burr of excess material known as weld flash is generated along the weld joint and this may extend in excess of 30 mm from the weld joint. This is shown in FIG. 1 which shows a rotor disc 1 with a blade 2 attached at a weld joint 3. Weld flash 4 extends from the weld joint 3. The weld flash is typically removed manually using a hammer and chisel prior to the welding of the adjacent blade. The use of a hammer and chisel poses a high risk of damage to the blade and also poses a health and safety risk to personnel using the tools. Furthermore, the manual nature of the flash removal does not allow accurate control of the weld flash removal.

There is the need for a process for the removal of weld flash at a weld joint that allows accurate control of the flash removal and that minimises the risk of damage to the blade and the risk of injury to personnel.

SUMMARY OF THE INVENTION

Accordingly, in a first aspect, the present invention provides a method of trimming weld flash from a weld joint formed between a first component and a second component, said method comprising:
  providing a rotary shear tool having a rotary blade and a second blade; and
  shearing the weld flash from the weld joint by passing the weld flash between the rotary blade and second blade of the rotary shear tool.

By using a rotary shear tool to shear the weld flash, damage to the components can be minimised and the trimming can be more accurately controlled than with a hammer and chisel because the rotary blade can move along one of the troughs typically present in weld flash.

Optional features of the invention will now be set out. These are applicable singly or in any combination with any aspect of the invention.

In some embodiments, the method comprises mounting the rotary shear tool on a robotic arm and moving the rotary shear tool using the robotic arm such that the weld flash passes between the blades of the rotary shear tool. This obviates the need for manual removal of the weld flash and thus eliminates the associated health and safety issues.

In some cases, the rotary blade is unpowered and moving the rotary shear tool using the robotic arm such that the weld flash passes between the blades causes the rotary blade to rotate to shear the weld flash from the weld joint.

In a second aspect, the present invention provides a rotary shear tool for trimming weld flash from a weld joint formed between a first component and a second component, said rotary shear tool comprising:
  a rotary blade;
  a second blade; and
  a mounting portion for mounting the rotary shear tool on a robotic arm.

In some cases, the rotary shear tool comprises a power source for driving rotation of the rotary blade. In this case, the method may comprise rotating the rotary blade using the power source whilst passing the weld flash between the blades of the rotary shear tool.

In some cases, the rotary blade has a smooth cutting edge extending in a circumferential direction.

In some cases, the rotary blade has a serrated cutting edge extending in a circumferential direction.

In some cases, the rotary blade and/or the second blade are formed of hardened steel or are formed of metal with a hardening coating such as a tungsten coating.

In some embodiments, the second blade is a fixed blade.

In some embodiments, the fixed blade comprises an upper surface and a lower surface with transverse edge surfaces extending therebetween.

The spacing between the upper and lower surfaces of the fixed blade (i.e. the thickness of the fixed blade) may be less than around 5 mm. This allows weld flash to be sheared from a weld joint where there is limited space between the weld flash and the first and/or second component.

In some embodiments, the rotary blade abuts the upper surface of the fixed blade and the method comprises passing the weld flash between the rotary blade and the upper surface of the fixed blade.

In some embodiments, the rotary blade abuts the upper surface of the fixed blade at an edge between the upper surface and one of the transverse edge surfaces. In this case, the method comprises passing the weld flash between the rotary blade and the upper surface of the fixed blade at the edge between the upper surface and one of the transverse edge surfaces.

In some embodiments, the fixed blade comprises a leading edge surface extending between the upper and lower surfaces perpendicular to the transverse edge surfaces. This leading edge surface may be chamfered, beveled or rounded to assist feeding of the weld flash between the blades. The method may comprises feeding the weld flash between the blades of the rotary shear tool over the leading edge surface.

In some cases, the first component is an aerofoil blade and the second component is an annular support (e.g. a rotor disc). In this case, the weld flash typically extends from the weld joint with minimal spacing between the annular support and the weld flash. The weld flash passes between the rotary blade and fixed blade of the rotary shear tool with the fixed blade (i.e. the lower surface of the fixed blade) proximal the annular support (i.e. between the annular support and the weld flash).

In some cases, the weld joint is formed from linear friction welding.

In a third aspect, the present invention provides a method of making a bladed disc for a gas turbine engine comprising:
  joining an aerofoil blade to an annular support at a weld joint using linear friction welding; and
  trimming weld flash from the weld joint using the method according to the first aspect and/or the rotary shear tool of the second aspect.

In a fourth aspect, the present invention provides a bladed disc having a weld joint trimmed of weld flash using the method according to the first aspect and/or the rotary shear tool of the second aspect.

In a fifth aspect, the present invention provides a bladed disc manufactured according to the third aspect.

In the sixth aspect, the present invention provides a gas turbine engine having a bladed disc according to the fifth aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 2:
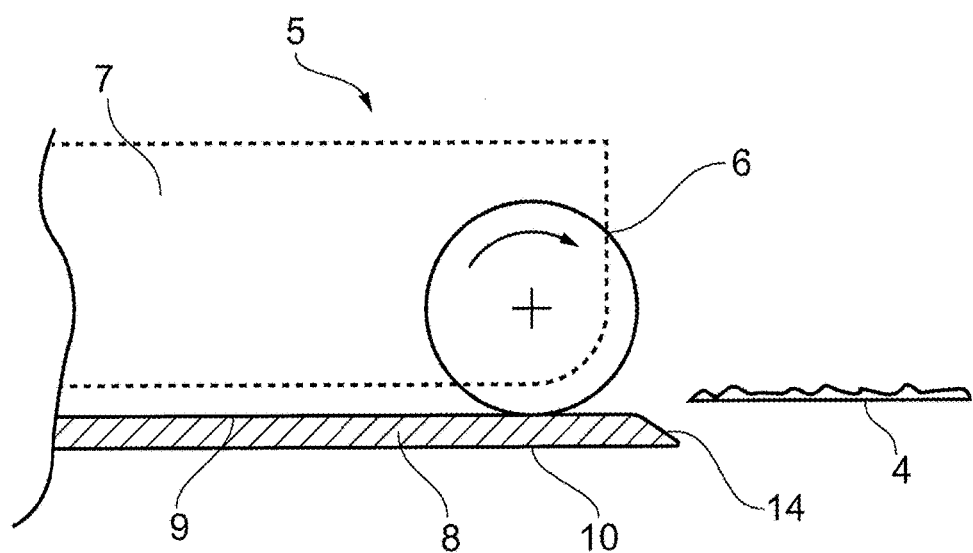
FIG. 2 shows a rotary shear tool used in a first embodiment.

FIG. 2 shows a rotary shear tool 5 having a rotary blade 6 mounted on a support arm 7 and a fixed blade 8.

Figure 3:
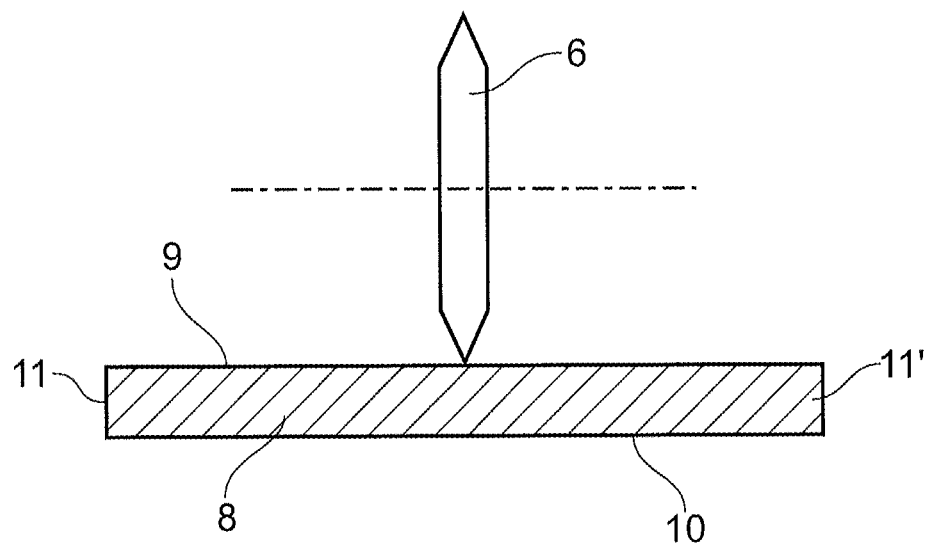
FIG. 3 shows an end view of the rotary shear tool shown in FIG. 2.

The fixed blade 8 has an upper surface 9 and a lower surface 10. The upper and lower surfaces are spaced by transverse edge surfaces, 11, 11' as can be seen in FIG. 3 which shows an end-on view of the blades 6, 8 of the rotary shear tool 5. The spacing d between the upper and lower surfaces (i.e. the thickness of the fixed blade/length of the transverse edge surfaces) may be less than 5 mm.

The rotary blade 6 abuts the upper surface 9 of the fixed blade 8.

Figure 4:
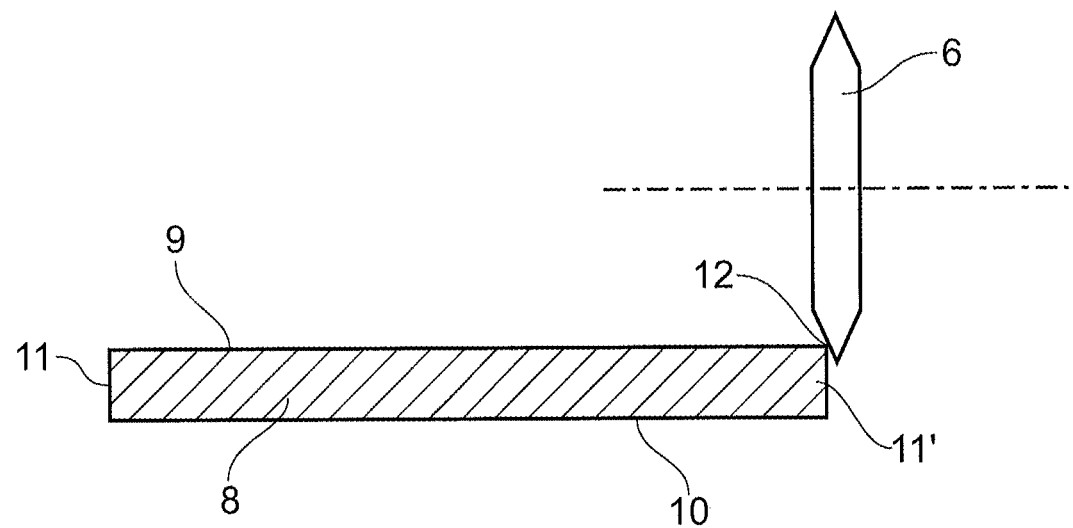
FIG. 4 shows an end view of a rotary shear tool used in a second embodiment.

In a second embodiment, shown in FIG. 4, the rotary blade 6 abuts the upper surface 9 of the fixed blade 8 at an edge 12 between the upper surface 9 and one of the transverse edge surfaces 11'.

The fixed blade 8 has a rounded leading edge surface 14 extending between the upper and lower surfaces 9, 10 perpendicular to the transverse edge surfaces 11, 11'.

The rotary blade 6 and fixed blade 8 are formed of hardened steel.

The rotary shear tool 5 is mounted on the end of a robotic arm (not shown).

The rotary shear tool 5 is used to trim weld flash from a weld joint.

Figure 1:
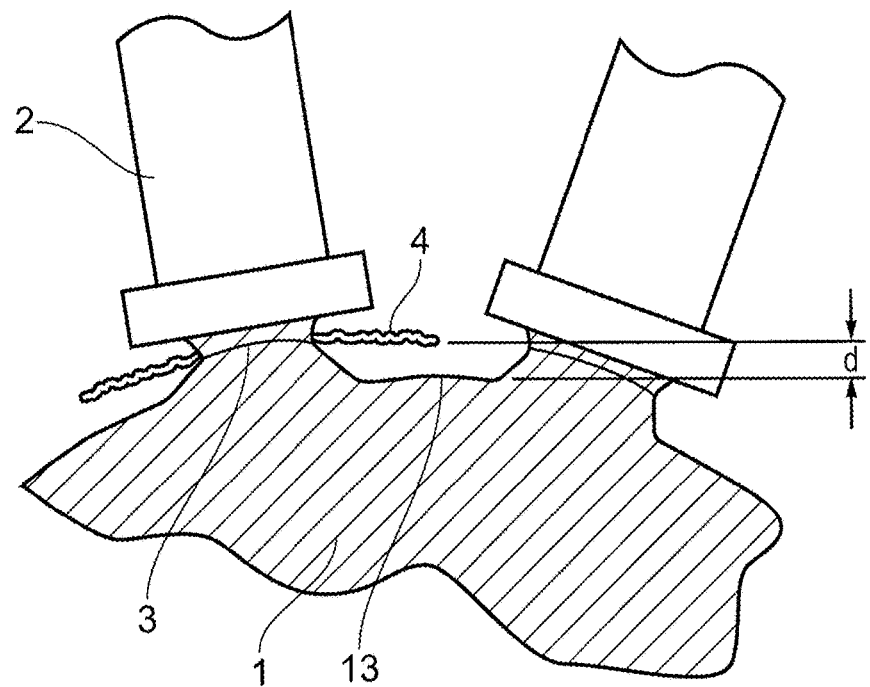
FIG. 1 shows a blisk with weld flash at the weld joints.

For example, FIG. 1 shows a blisk comprising a rotor disc 1 with a blade 2 joined to it at a weld join 3. The blade 2 is joined to the rotor disc 1 using linear friction welding which results in weld flash 4 extending from the weld join 3 in excess of 30 mm.

The weld flash 4 needs to be removed prior to the joining of an adjacent blade onto the rotor disc. There is minimal space (around 5 mm) between the weld flash 4 and the radially outer surface 13 of the rotor disc 1.

To remove the weld flash 4, the robotic arm aligns the rotary shear tool 5 so that the axis of rotation of the rotary blade 6 is perpendicular to the axial direction of the rotor disc 1. The robotic arm then moves the rotary shear tool in the axial direction so that the weld flash 4 is fed between the rotary blade 6 and the fixed blade 8 by the rounded longitudinal edge surface 14. The fixed blade passes between the radially outer surface 13 of the rotor disc 1 and the weld flash 4 with the lower surface 10 proximal the radially outer surface 13 of the rotor disc 1.

The action of moving the rotary tool in the axial direction of the rotor disc, causes the rotary blade 6, to rotate and, as it rotates, the weld flash 4 is sheared between the rotary blade 6 and the upper surface 9 of the fixed blade 8 (see FIG. 3) or the edge 12 between the upper surface 9 and the transverse edge 11' of the fixed blade (see FIG. 4) thus trimming the weld flash 4 from the weld joint 3.

In alternative embodiments, the rotary shear tool 5 is provided with a power source for driving rotation of the rotary blade 6 at the same time as the robotic arm moves the rotary shear tool 5 in the axial direction of the rotor disc 1.

Weld flash 4 generated from linear friction welding typically has a series of troughs and the troughs can be used to develop a tool path for the robotic arm with the rotary shear tool 5 with the rotary blade 6 moving in one of the troughs.

By using a rotary shear tool 5 to shear the weld flash 4, damage to the rotor disc 1 and blade 2 can be minimised and the trimming can be more accurately controlled than with a hammer and chisel because the rotary blade 6 can move along one of the troughs typically present in weld flash 4.

The use of a robotic arm for mounting and moving the rotary shear tool 5 obviates the need for manual removal of the weld flash 4 and thus eliminates the associated health and safety issues.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of trimming weld flash from a weld joint formed between a first component and a second component, said method comprising:
   providing a rotary shear tool having a rotary blade and a second blade; and
   shearing the weld flash from the weld joint by passing the weld flash between the rotary blade and second blade of the rotary shear tool,
   wherein the first component is an aerofoil blade and the second component is an annular support and the method comprises passing the weld flash from the weld joint between the rotary blade and second blade of the rotary shear tool with the second blade proximal the annular support.

2. A method according to claim 1 wherein the method comprises mounting the rotary shear tool on a robotic arm and moving the rotary shear tool using the robotic arm such that the weld flash passes between the blades of the rotary shear tool.

3. A method according to claim 1 wherein the rotary shear tool comprises a power source and the method comprises rotating the rotary blade using the power source whilst passing the weld flash between the blades of the rotary shear tool.

4. A method according to claim 1 wherein the second blade is a fixed blade having an upper surface and a lower surface with transverse edge surfaces extending between the upper and lower surfaces, and the method comprises passing the weld flash between the rotary blade and upper surface of the fixed blade of the rotary shear tool.

5. A method according to claim 4 comprising passing the weld flash between the rotary blade and upper surface of the fixed blade of the rotary shear tool at the edge between the upper surface and one of the transverse edge surfaces.

6. A method according to claim 4 wherein the spacing between the upper and lower surfaces of the fixed blade is less than around 5 mm.

7. A method according to claim 4 wherein the fixed blade comprises a chamfered, bevelled or rounded leading edge surface extending between the upper and lower surfaces perpendicular to the transverse edge surfaces and the method comprises feeding the weld flash between the blades of the rotary shear tool over the leading edge surface.

8. A method of making a bladed disc for a gas turbine engine comprising:
   joining an aerofoil blade to an annular support at a weld joint using linear friction welding; and
   trimming weld flash from the weld joint by the method of claim 1.

* * * * *